United States Patent [19]

Barnabe

[11] 4,437,926

[45] Mar. 20, 1984

[54] METAL ALLOY WITH HIGH CATALYTIC ACTIVITY

[75] Inventor: Jean-Louis Barnabe, Chatou, France

[73] Assignee: Regie Nationale des Usines Renault, Boulogne-Billancourt, France

[21] Appl. No.: 429,543

[22] Filed: Sep. 30, 1982

Related U.S. Application Data

[62] Division of Ser. No. 166,400, Jul. 7, 1980, Pat. No. 4,384,891.

[51] Int. Cl.$^3$ .................. H01L 1/22; B22D 25/00; B01J 21/18; C25F 3/08

[52] U.S. Cl. .................. 156/654; 156/664; 148/2; 204/129.35; 204/146; 428/613; 428/666; 428/678; 428/685; 428/502; 428/185

[58] Field of Search .............. 204/129.35, 129.75, 204/146; 252/447; 148/2; 428/613, 666, 678, 428/685

[56] References Cited

U.S. PATENT DOCUMENTS

| | | | |
|---|---|---|---|
| 2,588,734 | 3/1952 | Kolodney | 204/129.35 |
| 3,063,917 | 11/1962 | Barto | 204/129.35 X |
| 3,117,864 | 1/1964 | Heath et al. | 148/2 |
| 3,594,134 | 7/1971 | Russell et al. | 204/129.35 X |
| 3,674,655 | 7/1972 | du Deschaux et al. | 204/129.35 |
| 3,753,883 | 8/1973 | Griggs | 204/129.35 X |
| 4,186,110 | 1/1980 | Jalan et al. | 252/447 |
| 4,292,208 | 9/1981 | Baldi et al. | 428/685 |

*Primary Examiner*—Donald R. Valentine
*Attorney, Agent, or Firm*—Oblon, Fisher, Spivak, McClelland & Maier

[57] ABSTRACT

Metal alloy having high catalytic activity. It comprises a refractory base metal mass containing carbon and at least one metal of the platinum type, the surface of which has been subjected to intergranular acid corrosion which produces microfissures and causes the formation of microcrystals of the platinum metals.

Application in exhaust catalytic converters.

The present invention relates to refractory metallic alloys exhibiting a high catalytic activity which are particularly useful for reducing exhaust gas pollution from automobiles.

4 Claims, No Drawings

METAL ALLOY WITH HIGH CATALYTIC ACTIVITY

This is a division of application Ser. No. 166,400 filed July 7, 1980, now U.S. Pat. No. 4,384,891.

In this area known methods, particularly for facilitating post-combustion of carbon monoxide and hydrocarbons, include the positive action of noble metals of the group VIII of the periodic table of elements as well as that of the mixed oxides of copper, nickel, cobalt, manganese, etc., deposited on refractory supports such as porous alumina.

The preceding products generally have satisfactory activity when they are new but have, at the same time, the following disadvantages:

Mechanical fragility, as is well recognized.

The catalyst, if it is in pellet form, is significantly degraded in operation; if it is constructed as a monolith it is necessary to use relatively complex mounting means to avoid breakage by mechanical or thermal shock.

Reduction of activity, frequently irreversible, after over-heating or contamination. Accidental overheating exceeding 1000° C. is common, due both to the large amount of energy released by the combustion of unburnt hydrocarbons and the poor thermal conductivity of the refractory supports which hinders the rapid dissipation of heat;

Relatively difficult recovery of the platinum metals due to their great dilution in a mass of very refractory material.

The present invention eliminates the above disadvantages and will be described with reference to the following examples, which are provided as illustrations and are not meant to be limiting.

The product according to the invention has the appearance of a refractory metal having all of the following properties: malleability, thermal and electrical conductivity, ductility, elasticity, weldability, etc. Its melting point is high, in the range of 1450° C. It may be made in the form of thin sheets, spread out, perforated, of chips, of pellets, of wires, etc. This metal can function continuously at temperatures up to the range of 1100° C. in combustion gases containing 14% carbon dioxide and water vapor, diluted with nitrogen and having a carbon monoxide content of between 0 and 4%, varying alternately from one side to the other of the stoichiometric mixture.

Recycling the alloy after prolonged use is easy and is carried out simply by remelting under vacuum; it is then reshaped and reactivated. Recovering the platinum metals contained therein is carried out by dissolving the product in diluted strong acid and separating the platinum metals by decantation, centrifugation or filtration. The catalyst according to the invention comprises a refractory base, preferably a refractory alloy containing 40 to 80% iron, containing, as alloyed constituents, small quantities of platinum and/or palladium, ruthenium, and rhodium in amounts up to 2%, preferably between 0 and 2% for platinum, palladium and ruthenium, and between 0 and 1% for rhodium. Such a composition, well suited for the production of a trifunctional catalyst, is as follows:

platinum from 0.1 to 0.2%
ruthenium from 0.1 to 0.2%
rhodium from 0.02 to 0.1%.

The following is another composition for producing a reduction catalyst:

platinum from 0.05 to 0.1%
ruthenium from 0.1 to 0.2%

Another composition intended for the production of an oxydation catalyst is as follows:

platinum from 0.1 to 0.2%
palladium from 0.05 to 0.2%.

Another characteristic of the catalyst according to the invention is its good resistance to oxidation at high temperature (above 1000° C.), in combustion gases from a motor running with a mixture between 0.80 and 1.10, and preferably between 0.99 and 1.01 of the stoichiometric ratio.

This is due to the nature of the alloy used in combination with the above-mentioned platinum metals. For example, it may be a refractory austenitic steel containing 20% chromium and 20% nickel, or a refactory erritte steel containing at least 20% chromium and 0.05 to 4% aluminum.

The usable austenitic refractory steels can contain different proportions of nickel and chromium as long as they contain between 15% and 50%; favorable results can be obtained with the folowing steels, containing:

25% nickel and 20% chromium
35% nickel and 15% chromium.

In addition, the alloy used should contain carbon in a proportion between 0.07 and 0.1%. This allows it to maintain its malleability while giving it the capacity for intergranular corrosion, which causes the production on its surface or in its bulk of microfissures at the grain boundaries. This gives rise to a superficial porosity and to a specific characteristic surface. The latter depends simultaneously on the dimensions of the grains in the structure, the depth of the intergranular corrosion and the subsequent chemical treatments (oxalation and oxidation) which causes microcrystals of platinum metals to form in the microfissures.

This intergranular corrosion is accomplished by first subjecting the alloy to temperatures between 450° C. and 800° C. at the time of annealing. The alloy thus treated is then subjected to intergranular corrosion in aqueous acid medium. These treatments cause the formation of chromium carbide at the grain boundaries and within the grains with a loss of chromium in the immediately surrounding area.

The following is the preferred method of preparing the catalyst according to the invention:

An alloy of chromium nickel, and iron, having a carbon content between 0.04% and 0.1%, and a platinum metal content from 0.05 to 1%, is produced by melting under vacuum, in a controlled atmosphere or in air.

The resulting ingot is treated by soaking beginning at 1150° C. then rolled in several successive passes with annealing treatments between the roll passes, if necessary, to obtain a thin sheet between 0.05 mm and 0.15 mm or wire from 0.05 to 0.3 mm in diameter. It is also possible, after rolling, to form chips from 0.05 to 0.1 mm in thickness or saddles with a thickness of 0.05 to 0.20 mm. The preceding products are again annealed at a temperature between 1050° C. and 1150° C. to homogenize the alloy and eliminate the work hardening, then returned to between 400° C. and 800° C. for a period of between 30 minutes and 10 hours. This process sensitizes the alloy to intergranular corrosion.

The surface is then cleaned by sanding, anodic dissolution in an acid bath or chemical cleaning. Then intergranular corrosion is carried out by soaking in an acid bath, which produces rapid formation of microfissures without significant loss of material or decrease of thickness. The alloy does not dissolve except at the grain boundaries, which indicates a surface passivation of the remainder of the surface. This operation is carried out in a chloronitric bath prepared by mixing nitric acid and concentrated or dilute hydrochloric acid. There are other equally appropriate baths, for example, nitrofluoric, nitrosulphuric, sulfocupric, chlorochromic, sulfochromic or oxalic. This intergranular corrosion may also be performed by electrolysis, by anodic corrosion in the presence of dilute acid (hydrochloric, hydroflouric, sulfhuric, oxalic, nitric) or in saline solution. An acid treatment follows in an aqueous acid bath (HCl or $H_2SO_4$) to widen the fissures and expose the microcrystals of platinum metals in the metallic matrix.

The alloy is then treated in an aqueous oxalic acid solution having a concentration between 5 and 30%, at a temperature from 60° to 90° C. for 2 to 8 hours.

This brings about a partial dissolution of the chromium and iron on the surface and in the microfissures with a simultaneous deposition of iron and nickel oxalates. After calcination a finely divided phase of oxides closely bound to the platinum metal microcrystals is obtained. This oxalate treatment can also be carried out by electrolytic deposition of iron and nickel oxalate during electrolysis of an aqueous oxalic acid solution using electrodes of the catalytic alloy. The product thus obtained is then either oxidized directly at the time of its use by the gases coming from the motor, or in an oven supplied with combustion gases from a burner operating between 600° and 700°, with alternating lean and rich mixture.

One can improve the properties of the alloy according to the invention by incorporating from 0 to 3% of various elements which serve as activators or as stabilizers, such as Ce, Cu, Mo, Ti, La, Ca, Y, Al, W, Y, Mn.

The following examples are carried out using combustion gases containing:
 1.5% carbon dioxide
 0.88% oxygen
 900 p.p.m. of propylene or propane
 200 p.p.m. of nitrogen oxides A laboratory catalytic reactor was used comprising a metallic ribbon 0.1 mm thick coiled in a spiral with an identical corrugated ribbon so as to produce 400 apertures per $cm^2$. The hourly space velocity of the gas was 100,000 $H^{-1}$.

EXAMPLE 1

An alloy containing:
 25% chromium
 20% nickel
 0.2% platinum
 0.15% rutherium
 0.05% rhodium
 0.03% carbon
 traces of sulphur and/or phorphorous
 balance iron is rolled to a thickness of 0.05 mm and annealed at 1050° C., then held at 600° C. for 8 hours and cooled slowly. It is shaped into the form of a catalytic block or of an honeycomb monolith and submerged for 30 minutes in a mixture of concentrated nitric acid containing 10% hydrochloric acid.

Material loss amounts to between 0.5 and 3%. It is then submerged for 2 minutes in an aqueous 20% hydrochloric acid solution. The reaction is vigorous and the article loses 0.5% of its weight. It is then submerged in a 20% oxalic acid solution at 80° C. for two hours. A finely divided iron and nickel oxalate deposit forms and adheres well, restoring the article to its original weight.

The catalyst thus obtained is oxidized at 350° C. to decompose the formed finely divided oxalate so formed into iron and nickel oxide. The product is tested between 200° and 500° C. and between 300° and 600° C. in the course of a linear rise in temperature as a function of time.

The yield R of the conversion of each pollutant is obtained by integration as a function of time and calculated in %.

The table below summarizes the results obtained in the course of the operation of the catalyst in alternating rich and lean mixtures, i.e. having, relative to the stoichiometric equivalent, an excess and a deficiency, respectively, for example of 2% of fuel, relative to the oxygen required for combustion.

A similar catalytic sample of the catalyst is successively aged for 5 hours at 700°, 800°, 900°, 1000°, and undergoes in sequence, in each case, the tests No. 1 and 2 and, optionally, 3. It was found that the first test after aging gives lower results than the following tests which benefit from the activation of the catalyst caused by the preceding test.

| State of the Catalyst | Test Temperature | RCO % | $RC_3H_8$ % | $RC_3H_8$ % | RNO % |
|---|---|---|---|---|---|
| Fresh | 200°–500° C. | 61 | 62 | | 67 |
| | 300°–600° C. | 90 | 95 | | 95 |
| Fresh | 200°–500° C. | 64 | | 16 | 63 |
| | 300°–600° C. | 96 | | 34 | 92 |
| Aged 5 hours at 700° C. | 200°–500° C. | 24 | 30 | | 34 |
| | 300°–600° C. | 53 | 63 | | 68 |
| Aged 5 hours at 700° C. | 200°–500° C. | 49 | | 27 | 52 |
| | 300°–600° C. | 82 | | 53 | 85 |
| Aged 5 hours at 800° C. | 200°–500° C. | 43 | | 21 | 51 |
| | 300°–600° C. | 77 | | 46 | 83 |
| Aged 5 hours at 900° C. | 200°–500° C. | 8 | 10 | | 13 |
| | 300°–600° C. | 34 | 40 | | 45 |
| Aged 5 hours at 900° C. | 200°–500° C. | 41 | | 16 | 45 |
| | 300°–600° C. | 72 | | 38 | 80 |
| Aged 5 hours at 900° C. | 200°–500° C. | 26 | 32 | | 38 |
| | 300°–600° C. | 53 | 63 | | 71 |
| Aged 5 hours at 1000° C. | 200°–500° C. | 4 | 5 | | 9 |
| | 300°–600° C. | 19 | 27 | | 30 |
| Product from preceding Test | 200°–500° C. | 36 | | 14 | 43 |
| | 300°–600° C. | 66 | | 35 | 77 |
| Product from preceding Test | 200°–500° C. | 27 | 33 | | 38 |
| | 300°–600° C. | 55 | 65 | | 71 |
| After 4 hours at 600° C., lean mixture | 200°–500° C. | 31 | 33 | | 30 |
| | 300°–600° C. | 63 | 66 | | 50 |

It will be observed that, even after the last test, the catalyst of the invention retains good activity.

EXAMPLE 2

The alloy of the preceding example is heat treated for 4 hours at 650° C., then subjected to anodic intergranular corrosion in a 1% solution of hydrochloric acid.

The voltage between the electrodes is 3 V, and the duration of the treatment is 10 minutes (preferably two cathodes are placed opposite the sample surface to be microfissured).

The sample loses, under these conditions, 1.5% in weight and becomes fragile (it breaks when bent).

After rolling up a corrugated sample and a flat sample to form a cylindrical honeycomb block, the product is subjected to an oxalation treatment in an aqueous solution of 20% oxalic acid at 80° for 2 hours.

The product obtained exhibits catalytic activity properties very close to those measured in Example 1.

EXAMPLE 3

The alloy of the preceding example is heated for 8 hours at 600° C., then subjected to intergranular corrosion in a solution of 10% oxalic acid, also containing 1% hydrochloric acid, using cathodic corrosion at a voltage of 3 V for 30 minutes, the cathode being made of a metal of the same nature as the anode and disposed symmetrically opposite the sample being microfissured. After this treatment, the solution contains nickel and iron oxalates in suspension (it is uniformly stirred and kept at the ambient temperature) and chromium oxalate in solution.

The current is then reversed so that the microfissured sample becomes the cathode; after electrolytic treatment for one hour there is a noticeable formation of a uniform and homogenous iron and nickel oxalate deposit on the sample serving then as cathode. The deposit thus formed is very adherent and is olive green in color.

After being shaped into a cylindrical honeycomb block, and product exhibits superior catalytic activity to that obtained in Example 1.

EXAMPLE 4

Example 2 is repeated except that the hydrochloric acid was replaced with ammonium chloride during anodic intergranular corrosion. The resulting product exhibits an activity identical to that measured in Example 1. Iron chloride, nickel chloride, and chromium chloride are formed in solution; the iron chloride having the tendency to precipitate in hydroxide form in a neutral environment. The resulting product has, after oxalation, an activity identical to that measured in Example 1.

I claim:

1. A method for producing an alloy consisting essentially of:
iron: 40–80% by weight
nickel: 0–40% by weight
Chromium: 0–40% by weight
carbon: 0.02–0.1% by weight
at least one platinum group metal: 0.05–2% by weight
comprising melting under vacuum or in air, said alloy having a carbon content of between 0.02 and 0.1% and a platinum metal content from 0.05 to 2%, treating the resulting product by annealing at a temperature of about 1150° C., then forming into thin elements such as sheets, wires, or chips, which are subjected in turn to successive annealing at a temperature between 1050° C. and 1150° C. and heating again between 400° C. and 800° C. for a period of time between 30 minutes and 10 hours producing sensitization to intergranular corrosion; then cleansing the surface of the alloy and subjecting to intergranular corrosion in an acid bath of chloronitric type, producing rapid microfissutation, then immersing in a 20% aqueous hydrochloric acid for two minutes and heating in a solution of between 5% and 30% oxalic acid at a temperature between 60° and 90° C. for about two hours, then oxidizing the resulting product at about 350° C.

2. A method for producing an alloy according to claim 1 wherein the intergranular corrosion is carried out by anodic corrosion in an acid diluted to about 1%, in which the alloy is the anode, the voltage between the electrodes being of the order of 3 V and the treatment lasting less than 30 minutes.

3. The process according to claim 2 wherein said metal alloy additionally comprises 0–3% by weight of at least one element selected from the group consisting of Ce, Cu, Mo, Ti, La, Ca, Y, Al, W and Mn to serve as an activator or stabilizer.

4. The process according to claim 3 wherein said platinum group metal is selected from the group consisting of:
platinum: 0.05–0.2% by weight
ruthenium: 0.1–0.2% by weight
rhodium: 0.05–0.1% by weight
palladium: 0.05–0.2% by weight

* * * * *